Oct. 8, 1957 C. TOUCHÉ Re. 24,368

ANIMATION UNIT FOR SIGNS

Original Filed Dec. 15, 1955

INVENTOR

Carlos Touche

BY Emory L. Groff

ATTORNEY

United States Patent Office

Re. 24,368
Reissued Oct. 8, 1957

24,368

ANIMATION UNIT FOR SIGNS

Carlos Touché, Monterrey, N. L., Mexico

Original No. 2,795,070, dated June 11, 1957, Serial No. 553,345, December 15, 1955. Application for reissue July 19, 1957, Serial No. 674,004

Claims priority, application Mexico March 12, 1955

4 Claims. (Cl. 40—138)

Matter enclosed in heavy brackets [ ] appears in the original patent but forms no part of this reissue specification; matter printed in italics indicates the additions made by reissue.

This invention relates to display signs for advertising purposes, and more particularly to an improved means for forming animated characters such as letters or numerals.

One of the objects of the invention is to provide an animation unit in the form of a support for a plurality of discs or spangles having exposed reflective surfaces, and which when moved by either natural or artificial air currents, independently and promiscuously produce a massive glittering effect to attract attention. In that connection, these supports are made of relatively thin gauge bendable metal, in strip form, and have angularly disposed arms for spacing and carrying the discs away from the face of the letter to thereby permit the discs to freely follow a relatively uninhibited path of movement to reflect light rays from any fixed or movable source.

Another object of the invention is to provide a support which is bendable to readily follow the outline of curved letters, or letters and numerals having straight and compound curved portions.

A further object is to provide the ends of the arms with a keeper terminal portion which easily fits into an opening preformed in the disc, and thereafter may be flattened out to positively lock the related disc on the arm.

With the above and other objects in view, which will more readily appear as the nature of the invention is better understood the same consists in the construction, combination, and arrangement of parts hereinafter more fully described and claimed, and shown in the accompanying drawings, in which Fig. 1 is a front elevation of a letter illustrating the application of the invention.

Similar reference characters designate corresponding parts throughout the several views.

Figure 1:
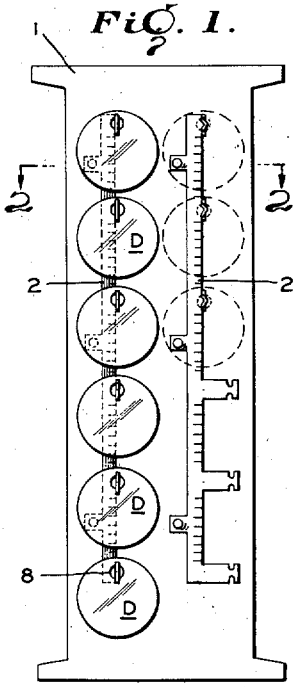
Figure 2:
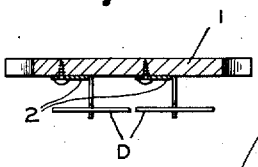
Fig. 2 is a horizontal cross-section taken on line 2—2 of Fig. 1.
Figure 3:
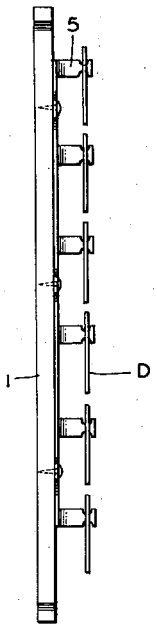
Fig. 3 is a side elevation of Fig. 1.
Figure 4:
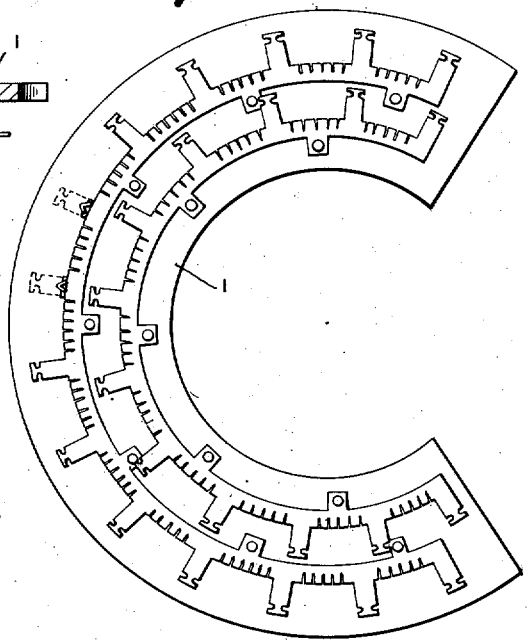
Fig. 4 is a view illustrating the adaptation of the disc support to curved letters.
Figure 5:
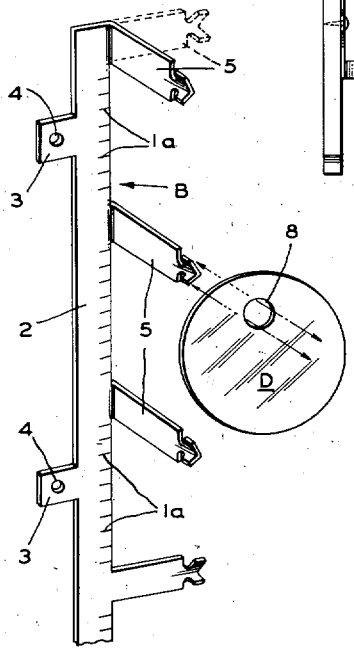
Fig. 5 is a detail perspective view of the support.
Figure 6:
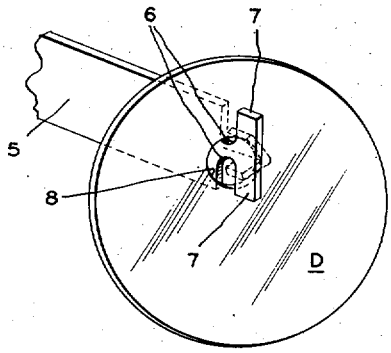
Fig. 6 is an enlarged detail perspective view of the keeper terminal of the support arms.

As will be seen from the drawing, any desired character or letter 1 forming part of a word or the like, may have the present invention applied thereto.

For example, the surface of the letter whether merely an outline, or a physical symbol itself, may have applied thereto a plurality of the present animation units each of which include elongated flexible supports B. These supports are preferably stamped out of metal, such as sheet aluminum, to provide a body strip 2 of any length and having at one edge thereof offset attaching means in the form of ears 3 provided with fastening receiving openings 4.

Either edge of the body 1, preferably the edge [having] *opposite* the ears, is slit or kerfed at spaced intervals as indicated at 1a, so that when the body 1 is to follow the outline of a curve, it may be bent or displaced in the plane of the body.

At the edge opposite the ears 3, the body 1 is provided with the right angularly disposed arms 5 located at each side of an ear. These arms have special keeper terminal portions for retaining the reflector elements such as the discs D. That is to say, each arm inwardly of the end thereof has the opposite edges thereof notched as indicated at 6, thereby to provide bendable wings 7. Said wings are initially pressed toward each other to more readily enter the hole 8 punched in the edge portion of reflector element D. This hole is of less diameter than the width of the arm.

When the disc is threaded on the arm it rests in the valley of a notch and the wings are forced back, by application of the jaws of a pair of pliers or the like, into coplanar relation to the main portion of the arm. In this way the wings lock the disc on the arm since the spread of the wings is greater than the diameter of the hole 8. Therefore, the discs can move freely on the arm but cannot come off the end. Thus, the discs may be readily and easily installed on the arms.

The spacing of the arms along the edge of the body strip is preferably such that the discs mounted on adjacent arms cover the body strip, thus giving the illusion of massed discs substantially covering the outline of a letter. When the discs are set in motion, they provide a myriad of reflecting surfaces which produce an unusually brilliant effect.

As previously set forth the body strips are bendable in the plane of the body because of the slits, but it will, of course, be understood that the strips 2 are bendable in the direction of their length. Thus it is possible with the present invention to wrap the strips spirally about a post or the like to provide a further novel animated effect.

It will also be understood that both straight and curved strips may be laid side by side in any degree of spacing, and with the spaced arms disposed in staggered relation, to produce many different reflective patterns.

The discs D may be polished for brightness or may be surface colored as desired. Moreover while discs have been described, it will be apparent that the physical features of the invention are the same if other geometrical shapes are used.

From the foregoing it will be seen that the present invention provides a simple, practical, and economical unit of construction which has a wide range of flexibility in use.

I claim:

1. An animation unit for characters or letters of advertising signs, comprising, in combination, a reflector carrier including a body of substantially flat strip form and bendable to conform to the curvature of a letter, means for securing said body to a base on which the letter is to be formed, spaced arms on the body of the strip and angularly disposed to the side thereof opposite that secured to the base, terminal keeper portions on the arms, and reflector elements fitted over said keeper elements and interlocked therewith to be responsive to wind movement.

2. An animation unit for characters or letters of advertising signs, comprising, in combination, a support including a flexible body strip, attaching ears offset from one edge of the body strip in the plane thereof, spaced arms at the other edge of the strip and angularly offset from the body strip, terminal keeper portions on the arms, and a reflector element having a hole to receive said keeper portions, said keeper portions including deformable wings disposed in a normally contracted position initially to enter said hole and after the reflector is mounted on the arm to be expanded to lock the reflector loosely on the arm.

3. An animation unit for characters or letters of advertising signs, comprising, in combination, a support including a flexible body strip having slits at one edge, attaching ears offset from the edge of the body [having] *opposite* said slits, angularly disposed arms at the edge of the body [opposite] *having* the slits, the free terminal portions of said arms having their opposite edges notched inwardly to provide wings, said wings being normally pinched together, and a reflector having a hole to receive said pinched wings, said wings when flattened into the plane of the arm loosely locking the reflector in place.

4. In an animation unit for [charcters] *characters* or letters of advertising signs, a reflector having a hole, and a supporting arm having a terminal keeper portion for loosely securing said reflector, said keeper portion comprising deformable wings disposed in a normally contracted position initially to enter said hole and after the reflector is mounted on the arm to be expanded to lock the reflector loosely on the arm.

References Cited in the file of this patent or the original patent

UNITED STATES PATENTS 770,931 Seary et al. ---------- Sept. 27, 1904

FOREIGN PATENTS 423,438 France ---------- Feb. 15, 1910